US011025632B2

(12) United States Patent
Akella et al.

(10) Patent No.: US 11,025,632 B2
(45) Date of Patent: Jun. 1, 2021

(54) SERIAL NETWORK COMMUNICATION USING INTELLIGENT ACCESS POLICIES

(71) Applicant: Cisco Technology, Inc., San Jose, CA (US)

(72) Inventors: Anand Venkata Ramana Murthy Akella, San Jose, CA (US); Vishnuprasad Raghavan, Santa Clara, CA (US); Vamsidhar Valluri, Mountain View, CA (US); Raghuram S. Sudhaakar, Fremont, CA (US); Shesha Bhushan Sreenivasamurthy, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 16/210,817

(22) Filed: Dec. 5, 2018

(65) Prior Publication Data

US 2020/0036717 A1 Jan. 30, 2020

Related U.S. Application Data

(60) Provisional application No. 62/711,720, filed on Jul. 30, 2018.

(51) Int. Cl.
*H04L 29/06* (2006.01)
*H04L 12/403* (2006.01)
(Continued)

(52) U.S. Cl.
CPC .......... *H04L 63/101* (2013.01); *H04L 12/403* (2013.01); *H04L 63/0236* (2013.01);
(Continued)

(58) Field of Classification Search
CPC ................ H04L 12/403; H04L 63/101; H04L 2012/40215; H04L 63/0236; H04L 67/125; H04L 47/20; H04L 2212/00; G07C 5/008
(Continued)

(56) References Cited

U.S. PATENT DOCUMENTS 8,139,493 B2 3/2012 Kato et al.
9,031,710 B2 * 5/2015 Barrett .................. B60R 16/023 701/1
(Continued)

OTHER PUBLICATIONS

Relaying Controller Area Network Frames over Wireless Internetworks for Automotive Testing Applications—Johanson et al, Alkit Communications, Lulea University of Technology, Uppsala University, Mar. 2013 https://citeseerx.ist.psu.edu/viewdoc/download?doi=10.1.1.418.4082&rep=rep1&type=pdf (Year: 2013).*
(Continued)

*Primary Examiner* — Randy A Scott
(74) *Attorney, Agent, or Firm* — Behmke Innovation Group LLC; Kenneth J. Heywood; James J. Wong

(57) ABSTRACT

In one embodiment, a device of a vehicle receives a packet comprising a source address, a destination address, an internet protocol (IP) encapsulated controller area network (CAN) message, and CAN message identifier information. The device compares the source address, the destination address, and the CAN message identifier information to an access control list (ACL). The device makes a determination that delivery of the CAN message to the destination address would be a policy violation based on the comparison. The device drops the packet based on the determination that delivery of the CAN message to the destination address would be a policy violation.

19 Claims, 12 Drawing Sheets

(51) Int. Cl.

| | |
|---|---|
| ***H04L 29/08*** | (2006.01) |
| *G06F 21/44* | (2013.01) |
| *G06F 21/60* | (2013.01) |
| *H04L 12/813* | (2013.01) |
| *H04L 12/40* | (2006.01) |

(52) U.S. Cl.
CPC ............ *H04L 67/125* (2013.01); *H04L 47/20* (2013.01); *H04L 2012/40215* (2013.01); *H04L 2212/00* (2013.01)

(58) Field of Classification Search
USPC ........ 701/1, 36, 51, 102; 726/1, 2, 9, 27, 30
See application file for complete search history.

(56) References Cited

U.S. PATENT DOCUMENTS 9,173,100 B2 10/2015 Ricci
9,277,370 B2 3/2016 Addepalli et al.
9,616,828 B2 4/2017 Ben Noon et al.
10,826,815 B2 * 11/2020 Kim ...................... H04L 63/101
2010/0305779 A1 * 12/2010 Hassan .................. H01Q 1/325 701/2
2019/0238638 A1 * 8/2019 Way ..................... G05D 1/0088
2019/0385057 A1 * 12/2019 Litichever ........... H04L 63/1416

OTHER PUBLICATIONS

"CAN over IP", https://www.embeddedrelated.com/showthread/comp.arch.embedded/31905-2.php, 13 pages, Accessed on Jul. 10, 2018, EmbeddedRelated.com.

Johanson, et al., "Relaying Controller Area Network Frames over Wireless Internetworks for Automotive Testing Applications", 2009 Fourth International Conference on Systems and Networks Communications, pp. 1-5, 2009, IEEE.

* cited by examiner

900

| RECEIVERS | IP ADDRESS | MAC ADDRESS | MAC ADDRESS (FOR AVB) | DESTINATION ADDRESS ID (FOR AVB) |
|---|---|---|---|---|
| ESU,SR_SD_CMR_LH | 239.0.4.2 | 01:00:5E:00:04:02 | 91:E0:F0:00:04:02 | 0402 |
| ESU,SR_SD_CMR_RH | 239.0.4.1 | 01:00:5E:00:04:01 | 91:E0:F0:00:04:01 | 0401 |

FIG. 9

SERIAL NETWORK COMMUNICATION USING INTELLIGENT ACCESS POLICIES

RELATED APPLICATION

This application claims priority to U.S. Provisional Patent Application No. 62/711,720, filed on Jul. 30, 2018, entitled "SERIAL NETWORK COMMUNICATION USING INTELLIGENT ACCESS POLICIES" by Akella et al., the contents of which are incorporated by reference herein.

TECHNICAL FIELD

The present disclosure relates generally to computer networks, and, more particularly, to secure car communication using intelligent access policies.

BACKGROUND

Serial networks, such as a Controller Area Network (CAN) Bus, are in wide use today across a number of different industries. For example, CAN Bus is the predominant networking technology in many modern vehicles, particularly automobiles. Despite the prevalence of serial networks in certain industries and products, other networking technologies such as Ethernet and the Internet Protocol (IP) are heavily dominant.

There has been a recent push to marry serial networks with Ethernet-based networking. For example, automobile networks that use CAN could potentially adopt Ethernet/IP-based networking to support high throughput applications such as video, radar, LIDAR, infotainment, and the like, as part of the same In-Vehicle Network (IVN). However, serial networks and Ethernet/IP-based networks are not directly compatible. Notably, serial networks, such as CAN, do not have a network layer. In addition, as serial networks become more open due to integration with other networking approaches, such as Ethernet and IP, security becomes more and more of a concern.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 9 illustrates an example address table; and

DESCRIPTION OF EXAMPLE EMBODIMENTS

Overview

Figure 1A:
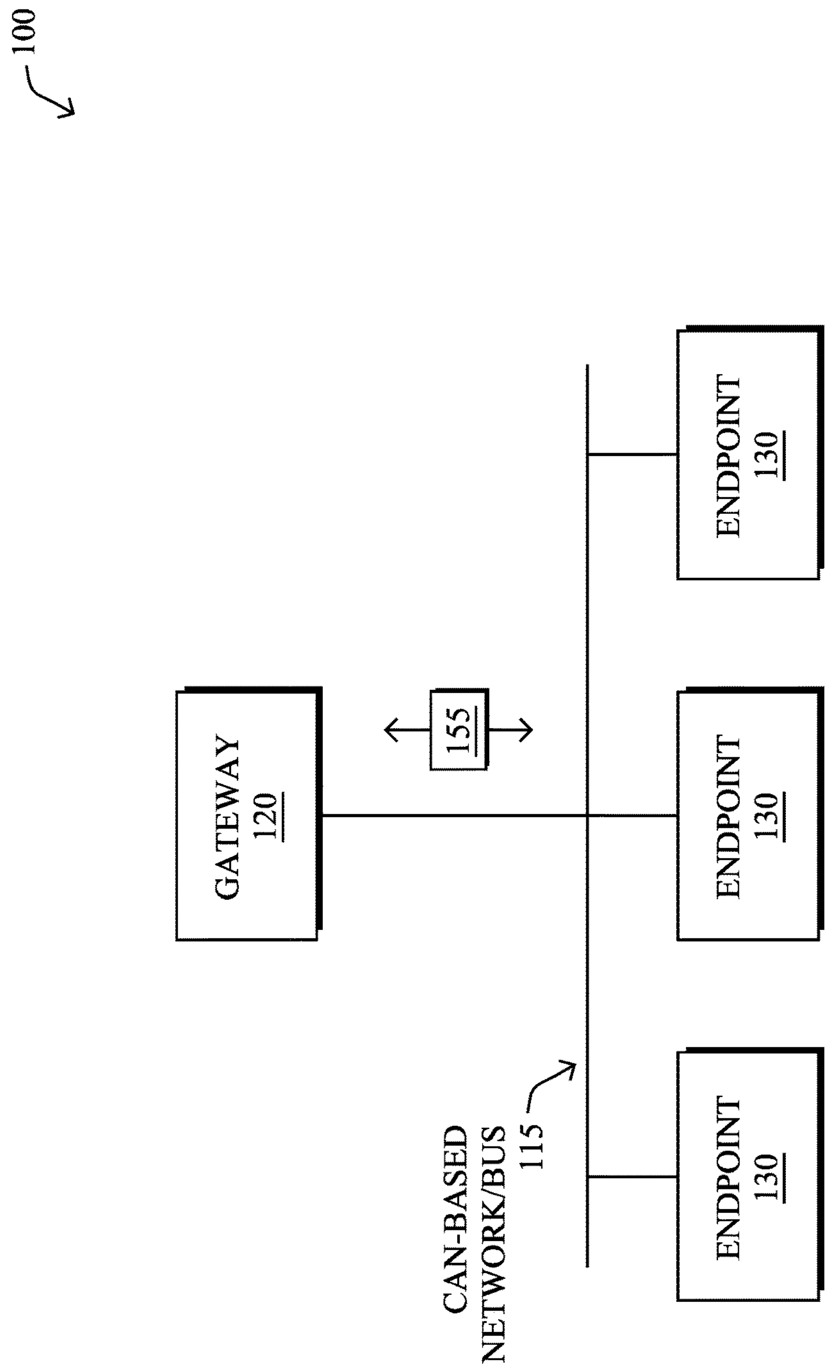
FIGS. 1A-1B illustrate an example communication system.

According to one or more embodiments of the disclosure, a device of a vehicle receives a packet comprising a source address, a destination address, an internet protocol (IP) encapsulated Controller Area Network (CAN) message, and CAN message identifier information. The device compares the source address, the destination address, and the CAN message identifier information to an access control list (ACL). The device makes a determination that delivery of the CAN message to the destination address would be a policy violation based on the comparison. The device drops the packet based on the determination that delivery of the CAN message to the destination address would be a policy violation.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. For example, the Internet may be viewed as a WAN that uses the IP for purposes of communication.

Serial networks are another type of network, different from an IP network, typically forming a localized network in a given environment, such as for automotive or vehicular networks, industrial networks, entertainment system networks, and so on. For example, those skilled in the art will be familiar with the on-board diagnostics (OBD) protocol (a serial network which supports a vehicle's self-diagnostic and reporting capability, including the upgraded "OBD II" protocol), the CAN Bus (or CAN BUS) protocol (a message-based protocol to allow microcontrollers and devices to communicate with each other in applications without a host computer), and the MODBUS protocol (a serial communications protocol for use with programmable logic controllers, such as for remote terminal units (RTUs) in supervisory control and data acquisition (SCADA) systems). Unlike an IP-based network, which uses a shared and open addressing scheme, a serial communication network generally is based on localized and proprietary communication standards, where commands or data are transmitted based on localized device identifiers, such as parameter identifiers (PIDs), localized station addresses, and so on.

Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network. The IoT is widely used in various fields such as medical, engineering and automotive industry. For example, IoT technology is being applied in the automotive industry to build smart-connected cars.

FIG. 1A illustrates an example communication system 100 illustratively comprising a serial network/bus 115, along with a gateway (or other network device) 120 interconnecting the serial network/bus 115 with one or more other external networks. The serial network 115, in particular, illustratively comprises one or more endpoints 130 (e.g., a set of one or more controlled devices, sensors, actuators, controllers, processors, and so on), such as part of a vehicular network, an industrial network, etc. The endpoints may be interconnected by various methods of serial communication. For instance, the serial network/bus 115 may allow the endpoints 130 to communicate serial data 155 (e.g., commands, sensor data, etc.) using predefined serial network communication protocols (e.g., OBD, CAN Bus, MODBUS, etc.). In this context, a serial network protocol consists of a set of rules defining how the endpoints 130 interact within the serial network 115.

Figure 1B:
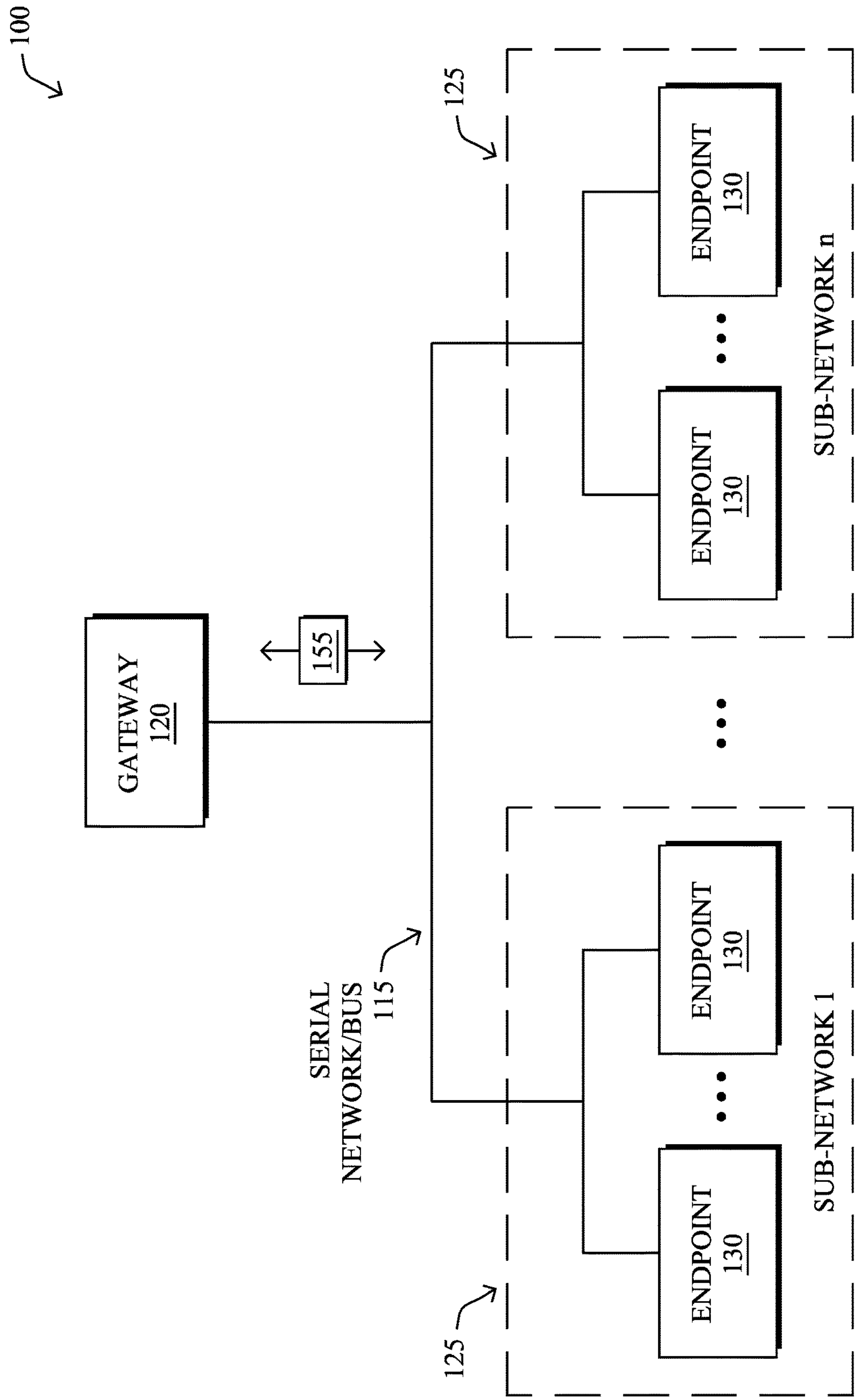

FIG. 1B illustrates one potential implementation of communication system 100, according to various embodiments. As shown, endpoints 130 may be organized into any number of sub-networks 125 of serial network/bus 115 (e.g., a first through nth sub-network). For example, in the case of a vehicle, the engine control system may be on one sub-network 125, the braking system (e.g., an anti-lock braking system, etc.) may be on another sub-network 125, etc. Each of sub-networks 125 may also provide different levels of performance, in some cases. For example, system critical components may be on a 500 kbps sub-network, whereas non-critical components may be on a 250 kbps sub-network. Interconnecting sub-networks 125 may be the gateway 120 and/or any number of gateways that interconnect different sub-networks 125.

Figure 2:
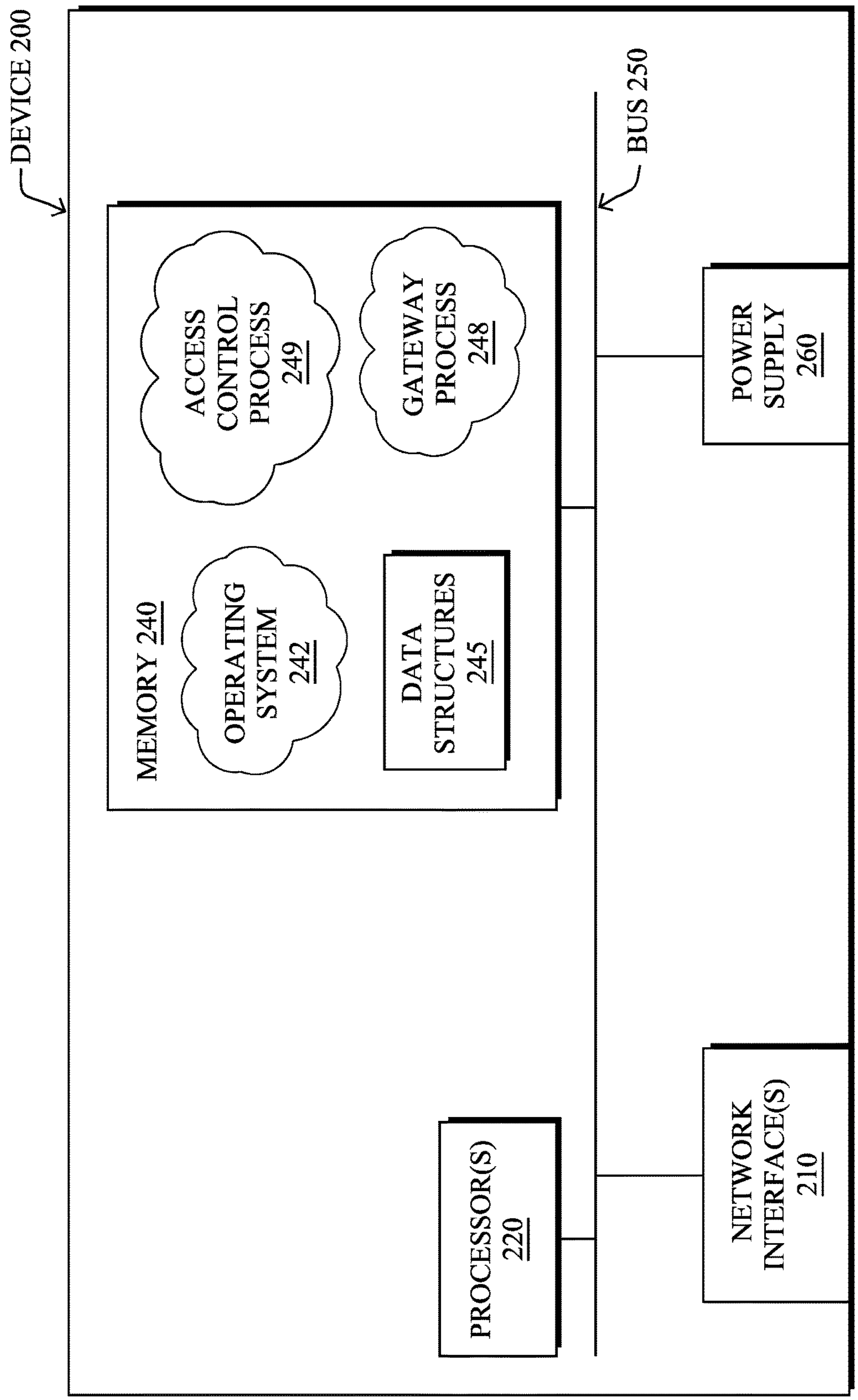
FIG. 2 illustrates an example network device/node.

FIG. 2 is a schematic block diagram of an example node/device 200 that may be used with one or more embodiments described herein, e.g., as any of the nodes/devices shown in FIGS. 1A-1B above, particularly as the gateway device 120 or an endpoint 130, or any of the other nodes/devices described below (e.g., a head unit in a vehicle, etc.). The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

In further embodiments, network interface(s) 210 may include the mechanical, electrical, and signaling circuitry for communicating data over links coupled to the serial network 115. Notably, one or more of network interface(s) 210 may be configured to transmit and/or receive data using a variety of different serial communication protocols, such as OBD, CAN Bus, MODBUS, etc., on any range of serial interfaces such as legacy universal asynchronous receiver/transmitter (UART) serial interfaces and modern serial interfaces like universal serial bus (USB).

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which is typically resident in memory 240 and executed by the processor, functionally organizes the device by, among other things, invoking operations in support of software processes and/or services executing on the device. These software processes/services may comprise an illustrative gateway process 248 and/or an access control process 249, as described herein. Note that while gateway process 248 and access control process 249 are shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, in general, serial networks, such as a CAN, are not directly compatible with Ethernet/IP-based networks. In particular, a CAN Bus does not include a network layer in its implementation. As such, there is no addressing information in the CAN frames. Rather, a CAN Message ID (MsgID) is the identifying information provided at the application layer of the networking protocol and is used for receiving and requesting information between CAN hosts. Information is broadcast over a CAN Bus, which may create a concern for security. Interworking serial networks with Ethernet/IP-networks may provide improvements to securing data and may further enable high throughput applications such as video, radar, LIDAR, infotainment, and the like, to be available as part of the same In-Vehicle Network (IVN).

The techniques herein provide a network layer architecture for supporting interworking a serial network (e.g., a CAN Bus, etc.) with an IP network. In some aspects, the techniques herein allow for secure serial data frames and remote frames to be supported between any host on the serial or IP network segments. Further, techniques herein allow intelligent access policies to be enforced such that serial data frames and remote frames are transmitted to intended devices, while serial data frames and remote frames are blocked from being transmitted to unintended devices.

Operationally, FIG. 3 and FIGS. 4A-4C illustrate examples of a hybrid network that includes a device (e.g., an ethernet switching unit (ESU), a gateway, etc.) between one or more serial networks and an IP network. In various embodiments, the device may convert between serial messages and IP messages.

Figure 3:
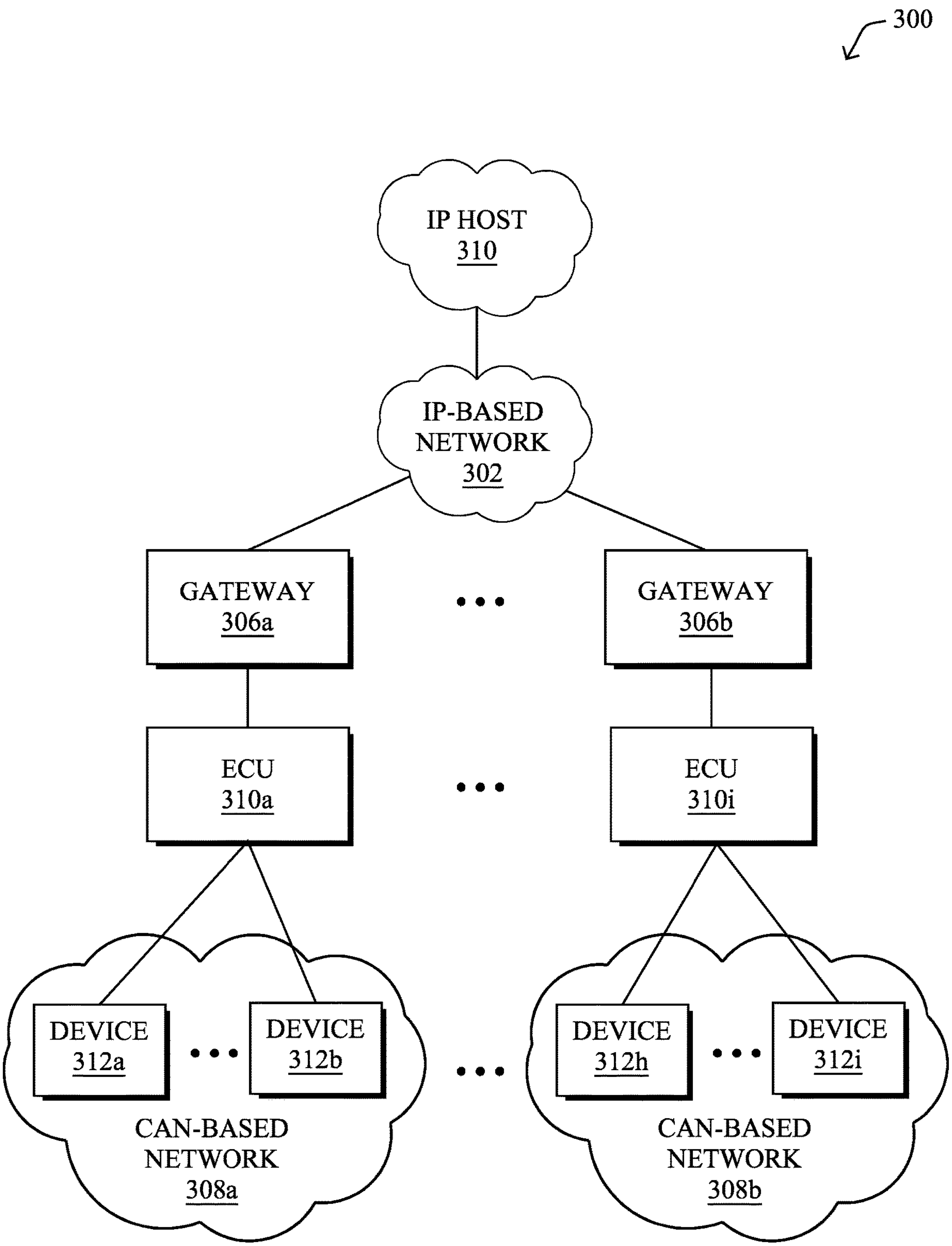
FIG. 3 illustrates an example hybrid network.

As shown in FIG. 3, network 300 (e.g., an IVN) may include one or more serial networks 308*a*-308*b* (e.g., CAN-based networks), each having one or more electronic control units (ECUs) (e.g., ECU 310*a*-310*i*) and one or more controlled devices (e.g. device 312*a*-312*i*). The ECUs 310*a*-310*i* may include modules controlling one or more electrical systems or subsystems in a vehicle, such as the powertrain, transmission, braking, timing, or suspension systems, and the controlled devices may be a sensor, actuator, etc. of a vehicle system. As shown, the ECUs 310*a*-310*i* and controlled devices may be interconnected by an IP gateway and/or switches (e.g., ESU, etc.) 306*a*-306*b* implemented in a door control unit (DCU), an in-vehicle controller unit (ICU), an advanced driver assistance system (ADAS) of a vehicle, or other processing devices. The DCUs allow serial communication between sets of control units and devices. Network 300 may further include backbone switch to direct communication between the gateways 306*a*-306*b*. Thus, the network may include serial networks interconnected with an IP network 302 by the IP gateways 306*a*-306*b* (e.g., network 10.1.2.0/24 and gateway 10.1.2.1, etc.) that allows communication with an IP host 310.

In various embodiments of the present disclosure, for the interworking of serial networking, such as CAN-based networking, with IP-based networking, a networking layer may be created in which CAN communication packets and IP packets are interconverted (e.g., from IP to CAN or from CAN to IP). The networking layer may be created at the gateways 306*a*-306*b* where the CAN over IP encapsulation may be performed. For example, since CAN is a broadcast network having no networking layer, broadcast capabilities may be recreated in the IP network via multicast of serial network messages encapsulated in IP packets on multicast addresses generated from the serial message identifier.

Figure 4A:
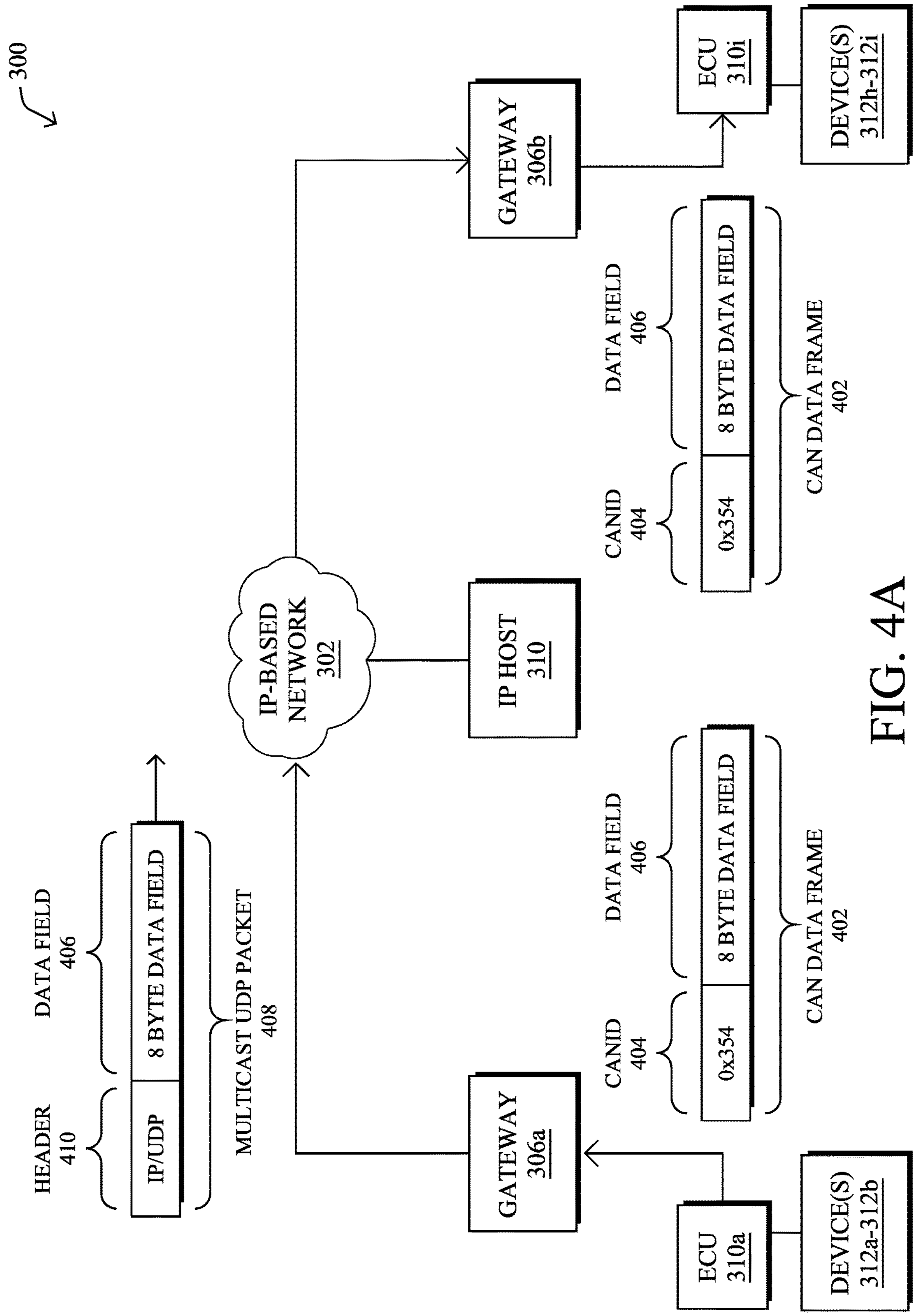
FIGS. 4A-4B illustrate examples of a gateway converting between serial network messages and Internet Protocol (IP) network messages.

In particular, in system 400 shown in FIG. 4A, CAN data frame 402, which is a serial network message generated by ECU 310*a*, may be received at gateway 306*a*. The CAN data frame may include CANID 404 as a serial message identifier and data field 406. In some embodiments, the serial message may be converted to a User Datagram Protocol (UDP) packet to be multicast to one or more destinations through the IP network 302. For example, as shown, CAN data frame 402 may be converted by gateway 306*a* to multicast UDP packet 408 with the following addressing scheme:

a source IP address, which is the assigned address of the gateway, a source UDP port, which may be random, a destination IP address, which may be an address in the multicast IP address space derived from and/or associated with the CAN ID, and a destination UDP port, which may be also derived from the CAN ID (for multiplexed CAN IDs over a single multicast address) or random (for non-multiplexed CAN IDs).

In this way, the CAN data frame which is effectively broadcast within the local serial network of ECU 310*a*, with CANID 404 and data field 406, may be converted by the gateway 306*a* into a multicast IP/UDP packet with header 410 and data field 406 to be communicated through the IP network 302 to one or more destinations. Said differently, the data frame of the serial message received by the gateway from a device (e.g., device(s) 312*a*-312*b*) in a serial network may be encapsulated by the gateway into an IP message that includes the IP address/addresses to which the message is destined.

The source/destination IP addresses and source/destination UDP ports may be determined by the gateway based, at least in part, on the serial message identifier. For example, packets sent by ECU 310*a* having CANID 404 may be determined by gateway 306*a* to be destined for multicast to ECUs/devices in a serial network connected to gateway 306*b* (e.g., ECU 310*i*), or potential other associated destinations, but may not be needed by IP host 310. Thus, gateway 306*c* may be authorized by gateway 306*a* to receive the IP message while IP host 310 is not authorized. Upon receipt, gateway 306*b* may, in some embodiments, decapsulate the converted IP message and broadcast the decapsulated serial network message within its serial network, which includes ECU 310*i* (and connected devices 312*h*-312*i*).

In some embodiments of the present disclosure, remote frames may also be generated and sent from a serial network through the IP network 302, in addition to or separate from a serial network message. Remote frames may be used to request information from a remote host and differ from data frames in that the serial message identifier of a remote frame may be considered as a remote address. That is, a remote frame is a request for whatever host "owns" that serial message identifier to broadcast, for example, its current value in a data frame. For this reason, the data frame would be sent as a unicast message to the address created from the serial message identifier.

Figure 4B:
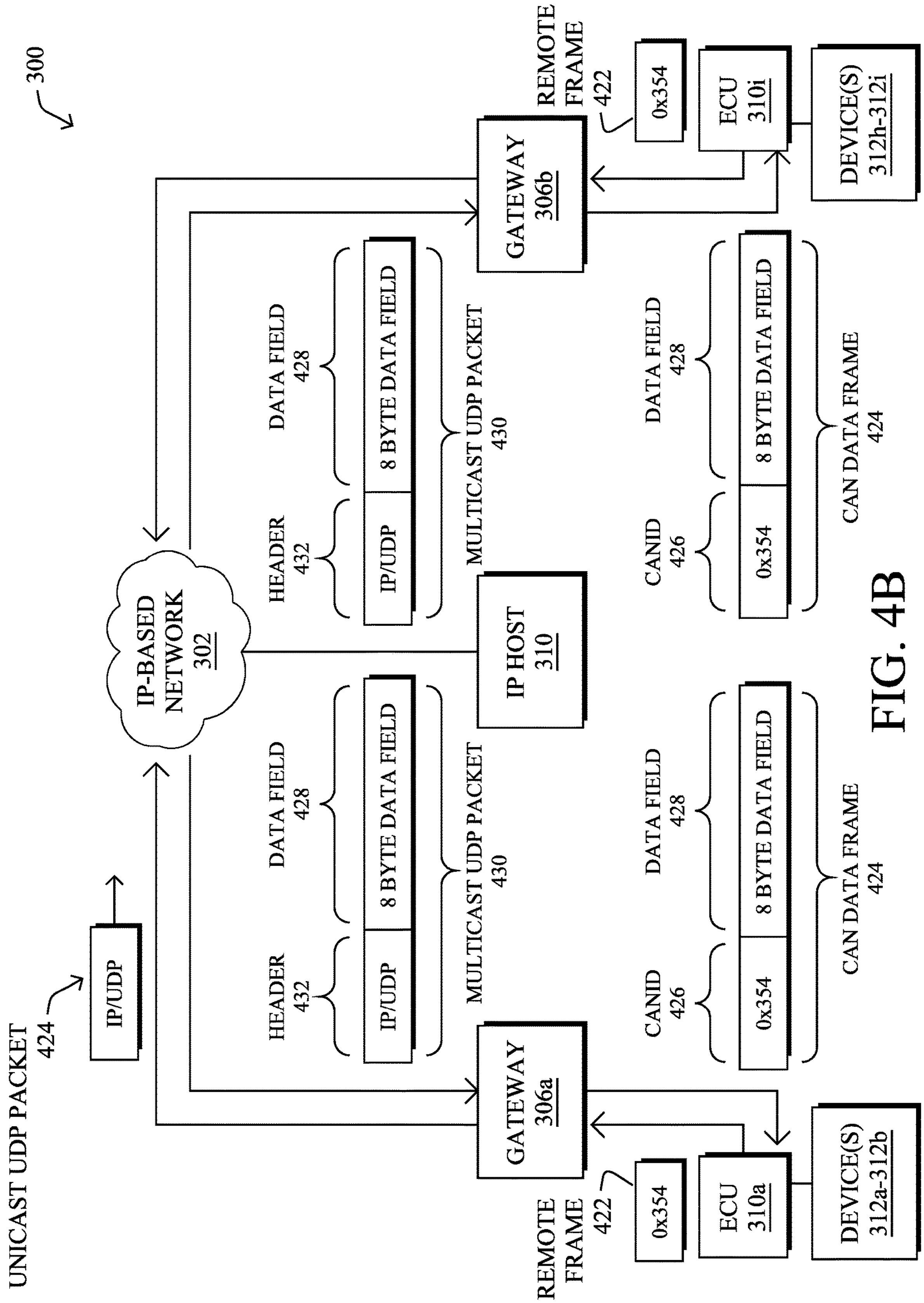

In particular, in system 420 shown in FIG. 4B, remote frame 422 may be sent by ECU 310*a* to gateway 306*a*, requesting information from ECU 310*i* as identified in the serial message identifier (e.g., a CAN ID). In some embodiments, the gateway may determine an IP address based on the serial message identifier of the remote frame. For example, as shown, gateway 306*a* may convert remote frame 422 to unicast UDP packet 424 with the following addressing scheme:

a source IP address, which is the assigned address of the gateway, a source UDP port, which may be random, a destination IP address, which may be a unicast address derived from and/or associated with the CAN ID of the remote frame, and a destination UDP port, which may also be derived from and/or associated with the CAN ID (for multiplexed CAN IDs over a single unicast address) or random (for non-multiplexed CAN IDs).

The converted unicast packet may then be sent to its destination, gateway 306*c* through IP network 302 which reconverts the UDP packet to be sent to ECU 310*i*. Upon receipt, the ECU 310*i* may respond to the remote frame by providing CAN frame 424 having CANID 426 and data field 428, which may be sent back to ECU 310*a* through IP network 412 using the techniques described in greater detail above and illustrated in FIG. 4A. Thus, CAN frame 424 may be converted (encapsulated) by gateway 306*b* to multicast UDP packet 430 having header 432 and data field 428 which may also be reconverted (decapsulated) by gateway 306*a* to CAN frame 424.

Furthermore, in some embodiments, data frames may be generated by a device in an IP network (such as an IP host) and sent to devices/nodes in a serial network. For example, an IP device may wish to communicate messages to a device in a CAN-based network, which may be particularly useful in vehicles or other control networks that are migrating from serial networking (e.g., CAN Bus) to Ethernet/IP networking. CAN data frames may be encapsulated IP/UDP packets with a unicast address created from the CANID.

As noted above, an IVN represents one approach to implementing IoT technology in the serial network of a vehicle. Such an IVN implementation, as described herein, typically includes CAN ECUs, CAN gateways (e.g., ICUs), Ethernet ECUs, and translation between CAN and Ethernet protocols. In order to support legacy sensors, the CAN gateway encapsulates CAN messages into IP messages and de-encapsulates IP to CAN before sending to the ECU. The various Ethernet ECUs can be connected via an ESU, which in turn interfaces to the CAN gateway.

Serial Network Communication Using Intelligent Access Policies

The techniques herein allow for the ternary content-addressable memory (TCAM) inside an ESU to determine whether delivery of a serial data frame (or remote frame)

would be a policy violation by using access polices or access control lists (ACLs). If the delivery of the serial data frame (or remote frame) would be a policy violation, the ESU can be configured to drop the serial data frame (or remote frame). The access policies can be implemented in such a way that the ESU can compare a specific field or range of CAN messages (e.g., CAN message identifier information) that are encapsulated inside IP packets. In situations where the access policy is programmed to match 5-tuple information of IP packets, then any packet can be encapsulated and transmitted over an IP connection. Further, the ESU can be configured to use key value pairs for pattern matching based on CAN message IDs.

Specifically, according to one or more embodiments of the disclosure as described in detail below, a device (e.g., an ESU) of a vehicle receives a packet comprising a source address, a destination address, an IP encapsulated CAN message, and CAN message identifier information. The device compares the source address, the destination address, and the CAN message identifier information to an ACL. The device makes a determination that delivery of the CAN message to the destination address would be a policy violation based on the comparison. The device drops the packet based on the determination that delivery of the CAN message to the destination address would be a policy violation.

Illustratively, the techniques described herein may be performed by hardware, software, and/or firmware, such as in accordance with the access control process 249, which may include computer executable instructions executed by the processor 220 (or independent processor of interfaces 210) to perform functions relating to the techniques described herein, e.g., in conjunction with gateway process 248.

Figure 5:
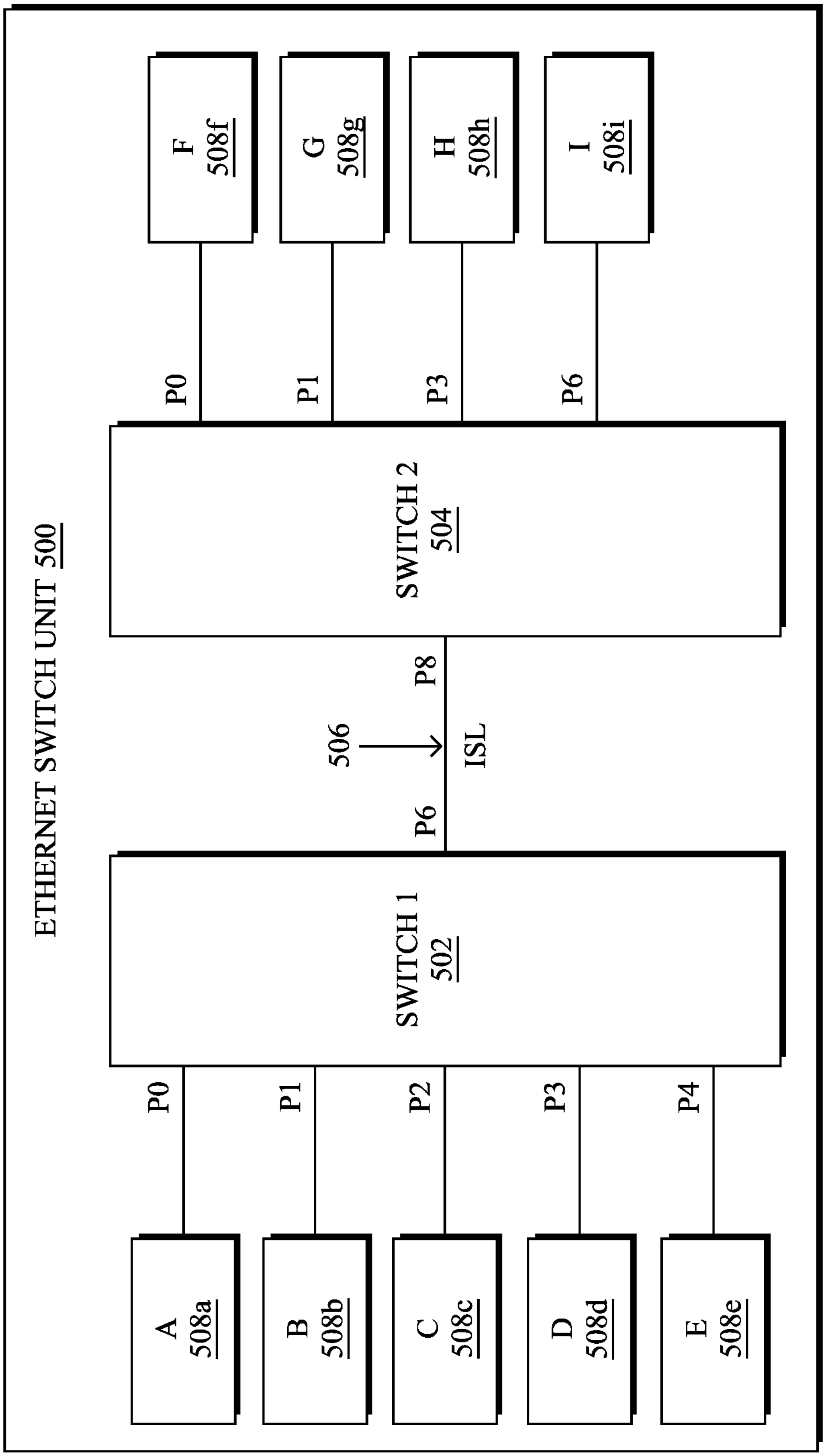
FIG. 5 illustrates an example Ethernet Switch Unit (ESU)

Operationally, consider the ESU 500 shown in FIG. 5. As shown, the ESU 500 includes two switches 502-504 that are interconnected using an inter-switch link (ISL) 506. The switches 502-504 allow for various traffic types such as unicast, multicast, and Audio Video Bridging (AVB). The ESU may interconnect different CAN-based networks 308*a*-308*b* (and corresponding ECUs 310*a*-310*i* and IP gateways 306*a*-306*b*), and various other components A to I 508*a*-508*i* inside a vehicle. Notably, the ESU shown may interconnect the following:

a) Displays;
b) Cameras—Front, Right, Left and Rear View Camera;
c) Other sensors; or
d) Vehicle subsystems, such as a braking subsystem, etc.

Figure 6:
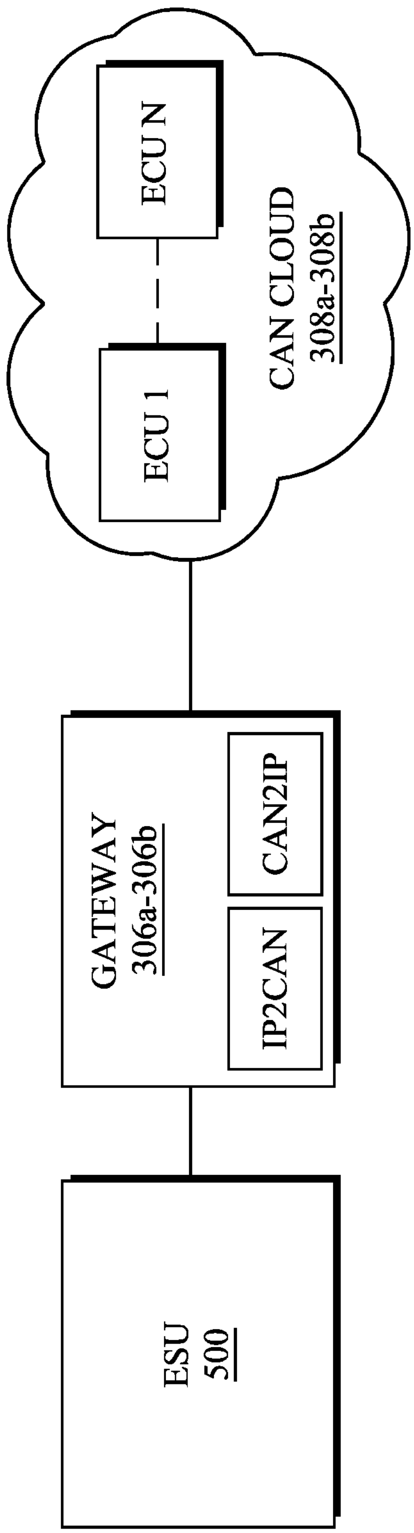
FIG. 6 illustrates an example ESU in a Controller Area Network (CAN)

Turning to FIG. 6, the ESU 500 connected to an IP gateway (e.g., IP gateway 306*a*-306*b*) is shown. The IP gateway 306*a*-306*b* connects to a CAN-based network (e.g., CAN-based network 308*a*-308*b*) that includes CAN-based devices. As described in greater detail above, for every CAN message there is a corresponding UDP packet defined in the Ethernet database. If the CAN message needs to be sent to multiple ECUs, then the packet is sent as multicast as it has multiple ECU receivers.

Returning to FIG. 5, and in greater detail with respect to the ESU 500, the ESU 500 can include the following components: an Address Resolution Logic (ARL) that functions similarly to Content Access Memory (CAM) and the TCAM. When a layer 2 (L2) packet comes for lookup in a switch of the ESU 500, the switch performs the following:

- identifies an L2 header of the packet (e.g., Ethernet type, source MAC address, destination MAC address, etc.);
- consults the ARL or CAM table on which port to send the traffic and identifies a source MAC address and incoming port of a sender of the packet;
- adds a rule in the ARL or CAM table, indicating that it identified the source MAC address, the incoming port, and a VLAN;
- if the entry does not exist in the ARL or CAM table, determines whether the TCAM register includes any access policies (e.g., rules for traffic) that prohibit traffic from the sender or to a receiver; and
- if there would be no access policy violation, floods the packet on all the ports, except the incoming port.

Similarly, when a layer 3 (L3) packet comes for lookup in the switch of the ESU 500, the switch 500 performs the following:

- determines whether the TCAM register includes any access policies (permit rules or deny rules) for L3 traffic;
- if there is a permit rule in an access policy, consults a routing table based on the L3 information (e.g., a destination IP address); and
- forwards the packet out of a port that matches with the L3 information (e.g., where destination IP address prefix is learned).

With respect to the TCAM, the TCAM can be used to configured access policies for Layer 2-7 packets; implement additional security for Ethernet or IP packets; ensure that only traffic that matches TCAM policies are sent out of the switch 500 and that any other traffic is dropped by the switch 500. Conventionally, when the TCAM is configured, the TCAM register includes at least one access policy based on a permit rule (e.g., the TCAMs comprises an implicit deny function). By way of example of the TCAM, consider the following access policies: (a) an IP access-list extended FILTER and (b) permit TCP any 10.128.0.0 0.0.0.255 EQ 8080. In such a case, the ACLs named "FILTER" allows HTTP traffic destined to 10.128.0.1 to 255 destination port matching 8080.

In general, there are a lot of traffic flows between different ECU modules of CAN-based networks, typically averaging more than 3,000 a flow. If each field in the flow is matched, this would require a large TCAM table on the switch 500, which may not be feasible. For example, conventional ASIC-based switches only support around 265 TCAM entries. In order to match all the flows, the system may summarize certain flows on the L2 level and also at the CAN message ID level. The summarization of individual flows entries at the L2 destination MAC address and CAN message can leave certain holes. But with help of the ARL table, the system is able to achieve the required security, as the destination MAC address should be present in the ARL table. If not, the packet will be dropped. With the TCAM summarization described herein, and with the help of the ARL, ACL-based security can be implemented for CAN traffic encapsulated in an Ethernet packet.

According to various embodiments, ACLs can be implemented in a serial network and, more specifically, an IVN, in a number of ways. In one embodiment, this can be achieved by encapsulating a CAN packet inside of an IP header. Alternatively, in another embodiment, this can be achieved by encapsulating the CAN packet within an Autosar header inside an IP header.

Figure 7:
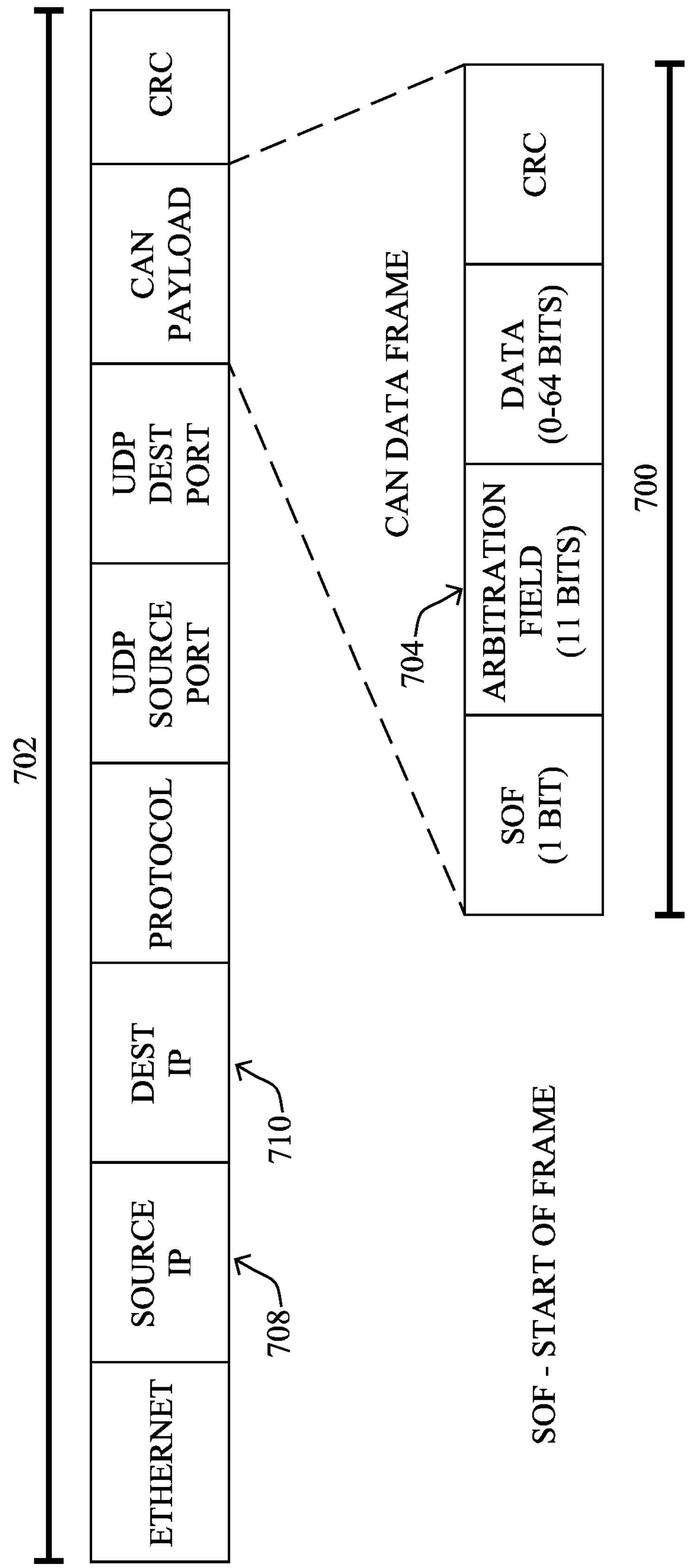
FIG. 7 illustrates an example of an Ethernet-encapsulated CAN frame.

CAN Packet Encapsulated Inside an IP Header:

Consider a case wherein an ECU sends a CAN message, and as shown in FIG. 7, the gateway 306*a*-306*b* can be configured to encapsulate a CAN payload 700 into an IP header 702 as shown in FIG. 7. In particular, the CAN payload 700 includes CAN message identifier information 704 comprising a CAN Arbitration field (e.g., 11 bits). Further, as described above, the gateway 306*a*-306*b* can encapsulate the CAN payload load 700 in the IP header 702, where the IP header 702 includes a source MAC address 708 and a destination MAC address 710.

When the CAN message identifier information 704 is the CAN arbitration field, the CAN arbitration field can be defined as prefix mask. A benefit of having the prefix mask is that it can allow for a range of arbitration ID or message IDs. For example, consider a case where the gateway 306*a*-306*b* wants to communicate with a component using the CAN protocol. In such a case, a vehicle manufacturer can define multiple message IDs starting from 0x0001 to 0x000F. In that case, the ESU 500 can be configured to compare L2 information of the received IP header 702, in particular, the source MAC address 708, destination MAC address 710, and the CAN message identifier information 704 to information included in an ACL to determine whether transmission of the received IP header 702 is a policy violation. In particular, the ESU 500 compares the prefix mask to a range of message ID prefix match, i.e., common bits 0x000_, where "_" denotes "don't care." In cases where the prefix match is not a match, the ESU 500 can be configured to drop the received IP header 702 (such that the message is not passed along).

Figure 8:
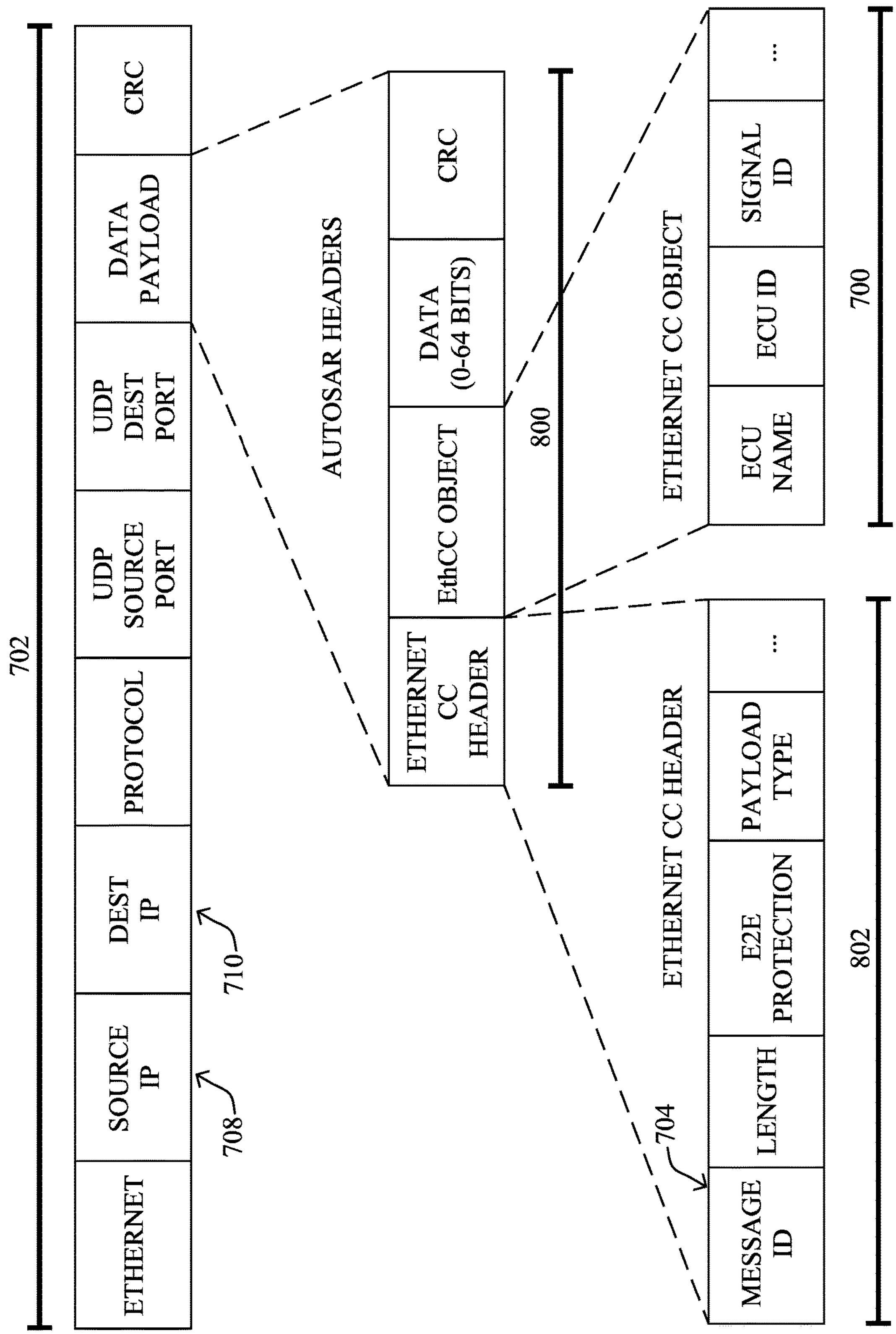
FIG. 8 illustrates an example of an Autosar-encapsulated CAN frame.

CAN Packet Encapsulated with Autosar Header Inside IP Header:

In some cases, the vehicle manufacturer may opt to encapsulate packets (e.g., CAN payloads) within an Autosar protocol header. Now, consider the case in which an ECU wants to send a CAN message to another ECU connected via the ESU 500. In that case and with reference to FIG. 8, if the gateway 306*a*-306*b* is following the Autosar standard, the CAN payload 700 can be encapsulated within the IP packet 702 inside of an Autosar header 800, as show in FIG. 8. The gateway 306*a*-306*b* can include the CAN message identifier information 704 in an ethernet CC header 802 of the Autosar header 800. Similar to as described above, the ESU 500 can be configured to compare L2 information of the received IP header 702, in particular, the source MAC address 708, destination MAC address 710, and the CAN message identifier information 704 to information included in an ACL to determine whether transmission of the received IP header 702 is a policy violation.

Furthermore, in either of the scenarios described above, the ESU 500 can be configured determine whether the destination MAC address 710 shares common bits with a range of destination addresses associated with the source address in the ACL. For example and with reference to FIG. 9, consider an ACL 900 of a gateway port the ESU 500, where the ESU 500 receives the IP packet 702 comprises information indicating that the IP packet 702 is to be sent to multicast groups 239.0.4.1 (01:00:5E:00:04:01) and 239.0.4.2 (01:00:5E:00:04:02). In such cases, instead of utilizing two entries in the ACL 900, the ESU 500 can determine whether the destination MAC address 710 is a prefix match with a range of destination MAC addresses, for example, from 01:00:5E:00:04:01 to 01:00:5E:00:04:0F, as shown in FIG. 9. The ESU 500 drops the unknown unicast flooding (when the destination MAC address 710 is not a prefix match with the range), thereby providing extra protection to filter out unwanted traffic. Stated in another way, the destination MAC address should be present in the ARL table. If not, the frame is considered as an unknown unicast frame and can be dropped by the ESU 500.

Figure 10:
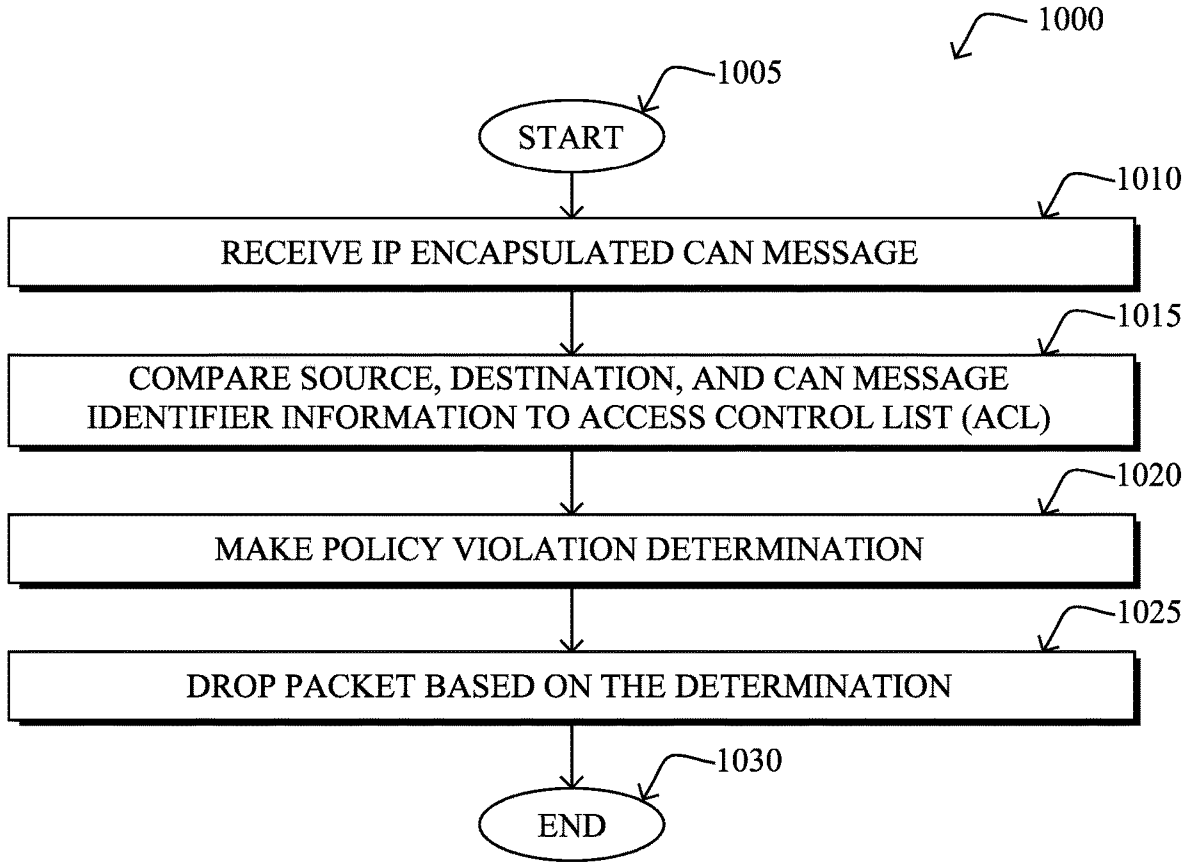
FIG. 10 illustrates an example simplified procedure for dropping an IP packet that encapsulates a CAN frame when delivery of the CAN message to the destination address would be a policy violation.

FIG. 10 illustrates an example simplified procedure for controlling messages broadcast by vehicles, in accordance with one or more embodiments described herein. For example, a non-generic, specifically configured device (e.g., device 200) may perform procedure 1000 by executing stored instructions (e.g., process 248). The procedure 1000 may start at step 1005, and continues to step 1010, where, as described in greater detail above, the device may receive a packet comprising a source address, a destination address, an internet protocol (IP) encapsulated Controller Area Network (CAN) message, and CAN message identifier information. In various embodiments, the device is an ESU or other component of a vehicle, such as part of an ADAS of the vehicle. Further, the packet can be sent by an ICU of a vehicle that encapsulates the CAN message with an IP header that includes a UDP source port and a UDP destination port. Additionally, the IP header can comprise an Autosar header.

At step 1015, as described in greater detail above, the device may compare the source address, the destination address, and the CAN message identifier information to an ACL of the device. As would be appreciated, access control is a key function within IP↔CAN networks, as closed CAN networks typically lacked any form of access control at all. In various embodiments, the techniques herein introduce an ACL mechanism whereby a custom ACL can be used to apply access control policies to IP encapsulated CAN messages.

At step 1020, the device may make a determination that delivery of the CAN message to the destination address would be a policy violation based on the comparison. In some embodiments, the device makes the determination that delivery of the CAN message to the destination address would be a policy violation by determining whether a prefix mask of the CAN message identifier information is not a match in a range of prefixes associated with the source address or the destination address; whether the CAN message identifier information does not share common bits with the range of prefixes associated with the source address and the destination address; or whether the destination address does not share common bits with a range of destination addresses associated with the source address.

At step 1025, as detailed above, the device may drop the packet based on the determination that delivery of the CAN message to the destination address would be a policy violation. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for secure car communication using intelligent access policies, such as automobiles, trains, planes, boats, or the like, or even certain non-vehicle devices. In some aspects, the techniques herein drop an IP packet that encapsulates a CAN frame when delivery of the CAN message to the destination address would be a policy violation. By dropping the IP packet, the techniques herein allow for secure communication for serial messages transmitted in a vehicle that are conventionally not sent over a computer network. In particular, the techniques herein enable a switch device (e.g., ESU) that is in communication with modules that encapsulate and de-encapsulate CAN payloads to use an ACL to determine whether transmission of the CAN payloads to or from particular devices of the vehicle are secure (e.g., vehicle manufacturer-approved). The device may implement prefix matching of CAN message identifier information, destination MAC addresses, etc.

While there have been shown and described illustrative embodiments that provide for applying access policies in a serial network, such as a vehicle network, it is to be understood that various other adaptations and modifications may be made within the spirit and scope of the embodiments herein. For example, while certain protocols are shown, such as CAN, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

receiving, by a device of a vehicle, a packet comprising a source address, a destination address, an internet protocol (IP) encapsulated controller area network (CAN) message, and CAN message identifier information;

comparing, by the device and based on an access control list (ACL), a) a range of prefixes associated with the source address or the destination address and b) a prefix mask of the CAN message identifier information, wherein the comparing comprises determining that the prefix mask of the CAN message identifier information is not a match in the range of prefixes associated with the source address or the destination address;

making, by the device and based on the comparing, a determination that delivery of the CAN message to the destination address would be a policy violation; and dropping, by the device, the packet based on the determination that delivery of the CAN message to the destination address would be a policy violation.

2. The method of claim 1, wherein the device is an ethernet switch unit (ESU).

3. The method of claim 1, wherein the packet is sent by an in-vehicle control unit (ICU) of the vehicle that encapsulates the CAN message with an IP header.

4. The method of claim 1, the packet further comprising a user datagram protocol (UDP) source port and a UDP destination port.

5. The method of claim 1, wherein the prefix mask of the CAN message identifier information does not share common bits with the range of prefixes associated with the source address and the destination address.

6. The method of claim 1, wherein comparing a) the range of prefixes associated with the source address or the destination address and b) the prefix mask of the CAN message identifier information comprises further comprises determining, by the device, that the destination address does not share common bits with a range of destination addresses associated with the source address.

7. The method of claim 1, wherein the IP encapsulated CAN message comprises an Autosar header.

8. The method of claim 1, wherein the device is part of an advanced driver assistance system (ADAS) of the vehicle.

9. An apparatus, comprising:

one or more physical network interfaces to communicate with a network;

a physical processor coupled to the network interfaces and configured to execute one or more processes; and a memory configured to store instructions executable by the processor, the instructions, when executed by the processor, configured to cause a device of a vehicle to:

receive, by the device, a packet comprising a source address, a destination address, an Internet protocol (IP) encapsulated controller area network (CAN) message, and CAN message identifier information;

compare, by the device and based on an access control list (ACL), a) a range of prefixes associated with the source address or the destination address and b) a prefix mask of the CAN message identifier information, wherein the comparing comprises determining that the prefix mask of the CAN message identifier information is not a match in the range of prefixes associated with the source address or the destination address;

make, by the device and based on the comparison, a determination that delivery of the CAN message to the destination address would be a policy violation; and drop, by the device, the packet based on the determination that delivery of the CAN message to the destination address would be a policy violation.

10. The apparatus as in claim 9, wherein the device is an ethernet switch unit (ESU).

11. The apparatus as in claim 9, wherein the packet is sent by an in-vehicle control unit (ICU) of the vehicle that encapsulates the CAN message with an IP header.

12. The apparatus as in claim 9, the packet further comprising a user datagram protocol (UDP) source port and a UDP destination port.

13. The apparatus as in claim 9, wherein the prefix mask of the CAN message identifier information does not share common bits with the range of prefixes associated with the source address and the destination address.

14. The apparatus as in claim 9, wherein the a) the range of prefixes associated with the source address or the destination address and b) the prefix mask of the CAN message identifier information further comprises determining that the destination address does not share common bits with a range of destination addresses associated with the source address.

15. The apparatus as in claim 9, wherein the IP encapsulated CAN message comprises an Autosar header.

16. The apparatus as in claim 9, wherein the device is part of an advanced driver assistance system (ADAS) of the vehicle.

17. A tangible, non-transitory, computer-readable medium storing program instructions that, when executed by a processor of a device of a vehicle, cause the processor to performs steps, comprising:

receiving, by the device, a packet comprising a source address, a destination address, an internet protocol (IP) encapsulated controller area network (CAN) message, and CAN message identifier information;

comparing, by the device and based on an access control list (ACL), a) a range of prefixes associated with the source address or the destination address and b) a prefix mask of the CAN message identifier information, wherein the comparing comprises determining that the prefix mask of the CAN message identifier information is not a match in the range of prefixes associated with the source address or the destination address;

making, by the device and based on the comparing, a determination that delivery of the CAN message to the destination address would be a policy violation; and dropping, by the device, the packet based on the determination that delivery of the CAN message to the destination address would be a policy violation.

18. The tangible, non-transitory, computer-readable medium as in claim 17, wherein the prefix mask of the CAN message identifier information does not share common bits with the range of prefixes associated with the source address and the destination address.

19. The tangible, non-transitory, computer-readable medium as in claim 17, wherein the a) the range of prefixes associated with the source address or the destination address and b) the prefix mask of the CAN message identifier information further comprises determining that the destination address does not share common bits with a range of destination addresses associated with the source address.

* * * * *